United States Patent [19]
Kristinsson

[11] Patent Number: 5,135,432
[45] Date of Patent: Aug. 4, 1992

[54] METHOD OF AND MACHINE FOR CUTTING NAPE MUSCLES FROM A FRONT-PART OF A FISH AND REMOVING THE SKIN FROM THE NAPE MUSCLE

[75] Inventor: Sigurdur Kristinsson, Reykjavik, Iceland

[73] Assignee: Jonatan HF, Reykjavik, Iceland

[21] Appl. No.: 714,898

[22] Filed: Jun. 17, 1991

[30] Foreign Application Priority Data

Jun. 22, 1990 [IS] Iceland .................................... 3596

[51] Int. Cl.⁵ .............................................. A22C 25/14
[52] U.S. Cl. ...................................... 452/160; 452/161
[58] Field of Search ................ 452/149, 160, 161, 170

[56] References Cited

U.S. PATENT DOCUMENTS

| | | | |
|---|---|---|---|
| 2,479,010 | 8/1949 | Jones | 452/161 |
| 3,380,114 | 4/1968 | Härtl et al. | 452/161 |
| 4,979,268 | 12/1990 | Kure | 452/108 |
| 4,985,965 | 1/1991 | Leauitt | 452/161 |

*Primary Examiner*—Willis Little
*Attorney, Agent, or Firm*—Nies, Kurz, Bergert & Tamburro

[57] ABSTRACT

A method and a machine for cutting a nape muscle of a fish from a front-part of a fish, after the fish has been parted, and removing the fish skin from the nape muscle. The method includes moving the front part along a fixed, straight track to and past vertical circular knives which cut vertical cuts at each side of the spinal crest and at the same time to and past horizontal fixed knife blade edges, fixed on the leading portion of a plough structure, which in turn is fixed to the shaft mount for the shaft of the circular knives. The plough structure cuts lateral cuts from the spine to the skin, but not through the skin. The outermost side part of the plough structure, the plough spade, is not sharp and is used to tear the nape muscle from the attached skin, when the skin is pulled forwards through a gap formed between the plough spade and a sliding table below the plough structure, the nape muscle being retained at the upper surface of the plough structure. The machine delivers the nape muscles without bones and without skin. The machine makes the lateral cuts opposite the bones and removes the skin from the nape muscles, with a tool structure including a gap between a plough and a table, the skin passing through the gap, so the skin is pulled through the gap while the plough spade retains the nape muscle and turns it over sidewards to a slide. For different sizes of fish the cutting unit is fixed on a parallelogram structure with a sensing sled to sense the height of the front part and raises or lowers the cutting unit. A more simple type of machine can cut the nape muscles, but not remove the skin.

8 Claims, 4 Drawing Sheets

METHOD OF AND MACHINE FOR CUTTING NAPE MUSCLES FROM A FRONT-PART OF A FISH AND REMOVING THE SKIN FROM THE NAPE MUSCLE

BACKGROUND OF THE INVENTION

In the processing of salmon, trout, redfish and some other species of fish, the first step of the process is to cut the fish in two parts by a cut behind the pectoral bone and pectoral fin. In this way a front part and a rear part are formed. This is called "parting". The rear part is cut into flitches, whereas the nape muscles belong to the front part goes into waste. The front part of a redfish proceeds to processing of meal, whereas the front part of salmon and trout is processed by jamming. Thus the nape muscles are not utilized as such by this known process, but belong to the waste from the flitches.

The nape muscles 12 are behind the head 4 and above the spine 5 of the fish and are considered the best part of the whole fish and are sold at a high price. Until now the nape muscles have sometimes been cut by hand from the front part, but it is a slow method and requires much work, 5-6 heads pr. minute.

The intention of the present invention is to cut the nape muscles from the front part mechanically by cutting over 100 heads pr. minute at three girls feeding the machine, and to make the nape muscle a product of great demand.

PROCESSING OF FISH

The principal parts of the fish are the intestines, skeleton, flesh, skin and fins. The flesh is the only part utilized as human food. Other parts are processed for meal. All processes begin by removing intestines, to prevent hormones and bacteria therein to enter into the flesh of the fish.

Then the head is cut from the body and removed. That cut is done either in front of or behind the pectorial bones, which are limiting the front edge of the flaps and the rear edge of the gill slits. When the cut is done in front of the pectorial bones, it is called "heading". Heading separates the head from the body. When the cut is done behind the pectoral bones, the operation is called "parting". Parting separates the fish into two parts, front part and rear part. Parting is mainly used in processing of salmon, trout and redfish. The present invention pertains to this method and includes cutting the nape muscles from the front part.

After removing the head by heading or parting, the process continues either by flitching or flattening. Flitching produces flitches for consumtion, drying or smoking, but most often for freezing. Flitching includes removing all bones and skin from the flesh and the product is flesh or a muscle without bones and without skin, which is called "flitches without bones and skin". Flattening includes removing the head and the spine opposite the belly, socalled "spine", from the fish. Flattening produces flattened fish for salting. Flattened fish includes the spine behind the belly, the pectoral bones, tail, fins and skin and also the flesh.

By flitching one flitch is formed from each side of the spine. Each flitch is with adjacent skin and a row of bones opposite the belly. After flitching the skin is removed from the flitch by cutting between skin and flesh. The skin is laid to a rough revolving cylinder, which catches the skin and moves the flitch to a revolving knife tangenting the cylinder behind the straight direction of motion. The cutting knife has a fixed shaft and cuts between the skin and the flesh, when the skin is pulled onwards by the cylinder. thus separating the skin and the flesh. Then the row of bones is by hand cut from the flitch. That is called cleaning. After this the flitching method delivers the flesh free of skin and-bones, called "a flitch without bones and skin". A known cutting of skin thus includes a revolving knife, cutting between flesh and the skin.

Fish processing thus includes the mechanical operations: Heading, parting, flattening and separation of skin by cutting. All these operations except the separation of skin include and are based on circular cutting knives in a plane parallel to the moving direction of the fish.

The knives are on a fixed shaft or on a shaft, which is movable to and from the track of the fish. The fish is moved along a straight and fixed line to and past a usually movable knife and into the cutting line of the knife, so that the knife cuts a straight cut into the fish parallel to the direction of motion. The fish is moved along a fixed track, whereas the knife is moved to and from the track, so that the cut is between the two parts, that are to be separated by the cut. For fishes of equal size, the shaft of the knife can be fixed, but for fishes of different sizes the shaft of the knife must be movable to and from the track according to the size of the fish. The shaft and the knife is then controlled according to the size of the fish. This control includes feeling the size of the fish by a feeler adjacent to the shaft. The feeler glides along the surface of the fish, when the fish is moved along the track, and moves the shaft of the knife to and from the track of the fish. By this means big and small fishes can be cut in the same machine with the same result.

This movement of the knife to and from the track is known. It includes a knife shaft adjacent to an arm, pivoting a fixed axle. This arm controlled knife shaft is therefore only fit for use for cutting the nape muscle, when the plough is not adjacent to the arm. By such unit the pivot movement of the arm would turn the direction of the unit from the fixed direction of motion of the fish.

SUMMARY OF THE INVENTION

To improve this the cutting unit, knife and plough, is according to the invention fixed onto two arms forming parallelogram. Thereby is formed a translation without rotation, and the direction of the unit remains in the direction of motion of the fish.

PROBLEM

It is known to move a fish along a fixed track and within the volume of motion of the fish to place knives in direction of the track cutting cuts parallel to the track. By means of this known method the nape muscles can be cut from the front part by placing the front part so that a line from its rear end of spine to the head bone (line 7 in FIG. 3), is parallel to the direction of motion. Then two vertical cuts along the spinal crest 8 and two horizontal cuts 10 to the spinal crest 8 are made. By means of this method the skin will belong to the nape muscle 1, and in that case the removing of the skin is an unsolved problem. The nape muscle is a small piece and difficult to place it for removing the skin in usual way. Never the less this method removes the nape muscle 12 from the front part 1.

The invention also includes another method, which also removes the skin from the nape muscle. In that case the horizontal or inclining cuts are not cut through the skin, and therefore not cut with revolving circular knives, but cut by a fixed sharp edge, which is called a plough knife 15, which splits the flesh by means of a 3 to 4 cm broad cut from the spinal crest. Following the sharp edge 15 and farther from the spinal crest is an unsharp edge 17 or an edge of a sheet, socalled plough spade 17, which is not a cutter, but forms against the sliding table 18 below a gap 20, through which the skin 13 is pulled but the nape muscle 12 not. The plough spade prevents the nape muscle in being pulled through the gap 20 along with the skin. The skin 13 is fixed to the front part, because it has not been cut from it. Therefore it is pulled forwards, whereas the nape muscle is left behind.

This is per se a new and unknown method for removing skin from a flesh, because it is performed without a cutting edge.

FIGURES

The invention will now be further described by means of following figures.

FIGS. 1 to 6 illustrate a front part of a fish, where the different parts of the front part are marked 1 to 13.

FIGS. 7, 8 and 9 illustrate a plough unit for cutting horizontal cut, tumbling the nape muscle 12 over sidewards, and a gap 20 for removing the skin from the nape muscle 12.

Figure 12:
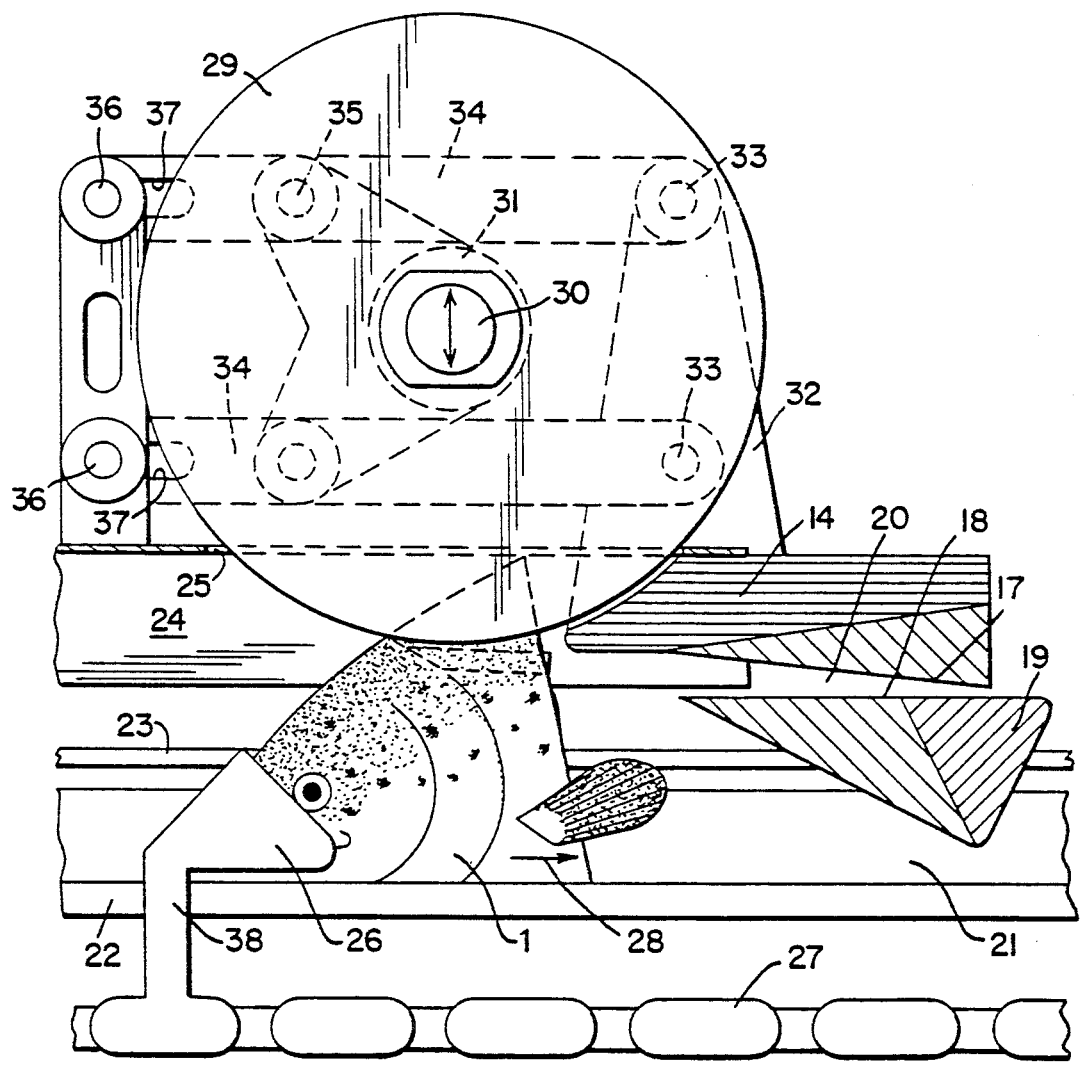

FIG. 12 illustrates the plough unit in position. Its fixtures to the housing of the knife shaft are not shown. The figure also illustrates control equipment for small and large front parts. The control equipment elevates the cutting unit higher for a large front part and increases the dept of the cut.

Figure 13:
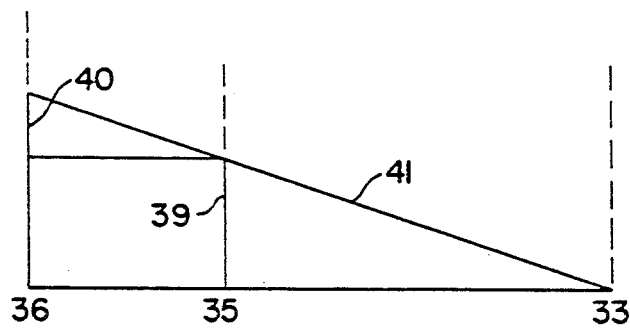

FIG. 13 illustrates how the depth of the cut is increased for larger front parts.

Figure 1:
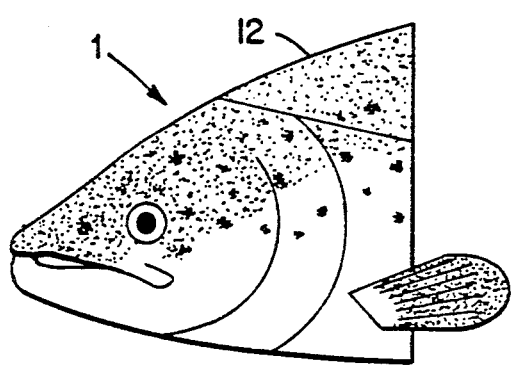

FIG. 1 illustrates a front part 1 of a salmon, the nape muscle 12 seen from one side.

Figure 2:
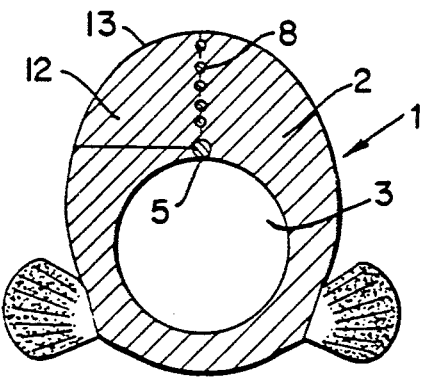

FIG. 2 illustrates a front part seen from behind. Fish muscle 2, belly 3, spine 5, spinal crest 8, nape muscle 12 and skin 13.

Figure 3:
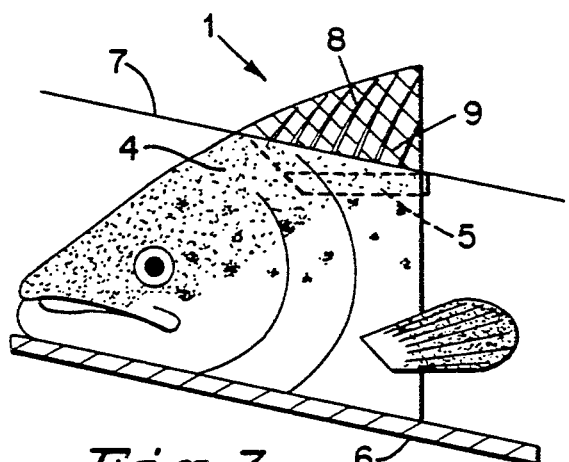

FIG. 3 illustrates a front part 1 seen from one side and resting on an inclined plane 6, where the cutting line 7 of the nape muscle 12 is parallel to the resting plane 6 and the nape muscle has been removed. The skin 13 of the nape muscle 12 is not illustrated in the figure. The headbone 4, spine 5, vertical cut along the spine crest 8, horizontal cut 9 from spine 5 to headbone 4 are shown in this figure.

Figure 4:
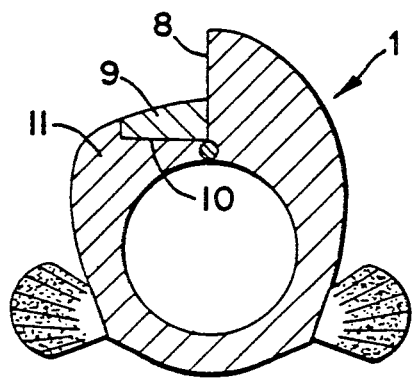

FIG. 4 illustrates a front part 1 seen from behind, where the nape muscle on one side has been removed. It illustrates a cut along spinal crest 8, horizontal cutting line 10, horizontal cut 9, and shows uncut muscle 11 from cut 10 to the skin 13, where the flesh will tear apart during the operation. If the knife 15, which cuts the cut 10, reaches to the skin 13, the skin 13 will be cut and will not be removed from the muscle.

Figure 5:
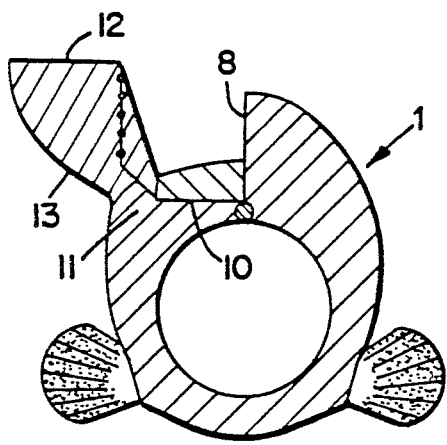
Figures 7, 8:
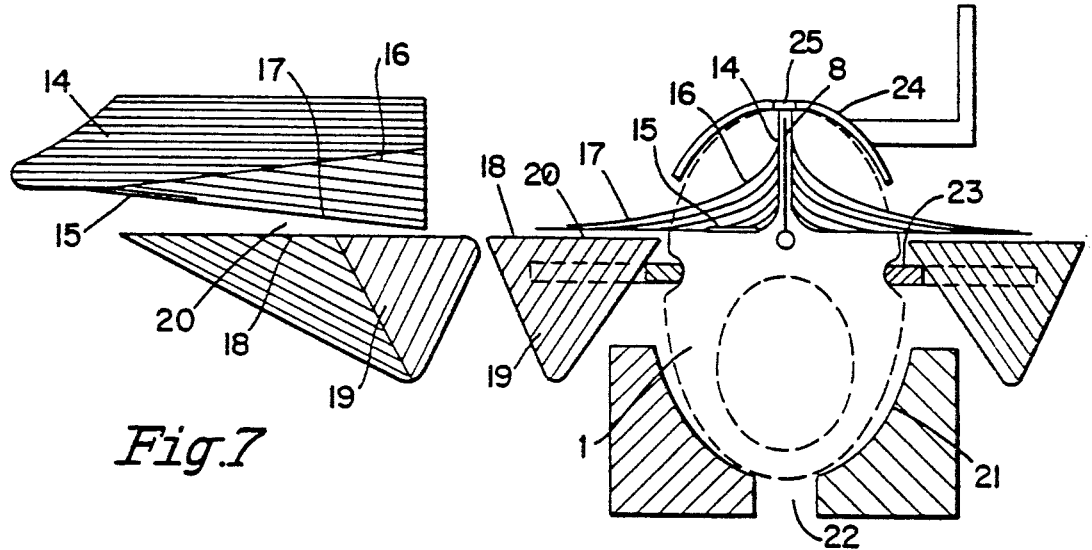
Figure 9:
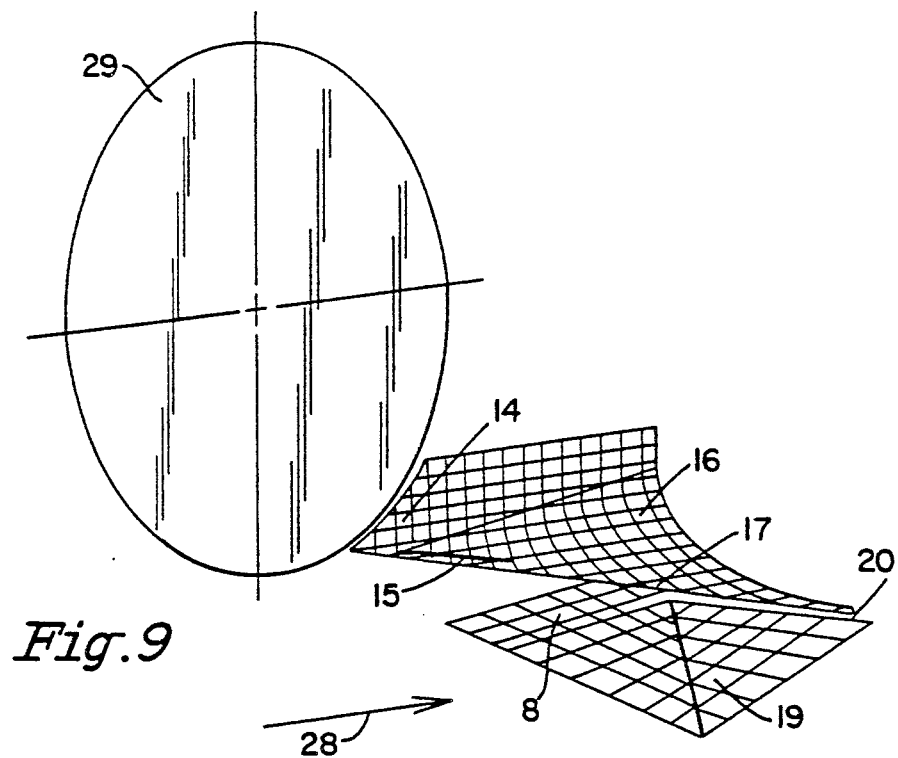

FIG. 5 illustrates a front part seen from behind, where the one of the nape muscles 12 together with the adjacent skin 13 has been cut by a vertical cut along the spinal crest 8 and a horizontal cut 10, and the nape muscle 12 has been tumbled over sidewards and rotated 90 degrees by the plough shoulder 16 (FIGS. 7 to 9). The narrow muscle portion 11 is uncut and has not been torn. The nape muscle 12 is in this position before the movement of the front part forwards pulls the skin 13 through the gap 20 (FIGS. 7 to 9) between the plough spade 17 and the sliding table 18, while the plough spade 17 retains the nape muscle 12 and tumbles it over sidewards into the slide 19 (FIGS. 7 to 9 and FIG. 12). The figure illustrates the fundamentals of removing the skin from the nape muscle 12.

Figure 6:
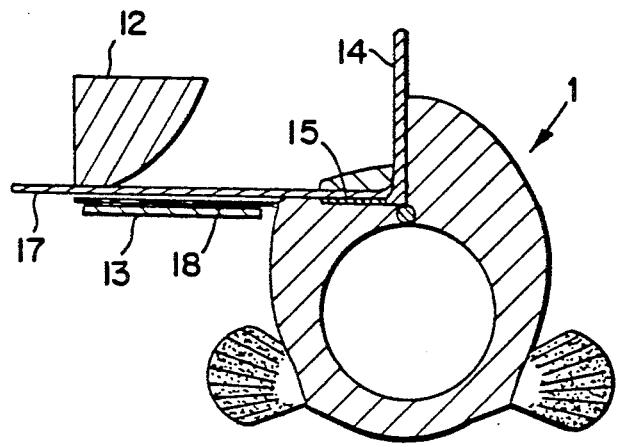

FIG. 6 illustrates the removing of the skin seen from behind. The plough crest 14 is right behind the vertical knife 29 (FIG. 12) and moves the nape muscle 12 from the spinal crest 8. The plough knife 15 cuts the cut 10 (FIG. 4) and plough shoulder 16 (FIGS. 7 to 9) elevates the nape muscle 12 and tumbles it over sidewards into the slide 19. The front part 1 is pushed forwards by the snout pusher 26 and the front part 12 pulls the skin 13 through the gap 20 between the sliding table 18 below and the plough spade 17 above. The plough spade 17 retains the nape muscle 12 and it tumbles over into the slide 19.

FIG. 7 illustrates the plough unit seen from one side, plough crest 14, plough knife 15, plough shoulder 16 and plough spade 17, which against the sliding table 18 forms the fish skin gap 20 through which the skin 13 is pulled when the skin is removed. After the removal of the skin, the nape muscle is free and falls into the slide 19.

FIG. 8 illustrates the plough unit 14 to 20 from behind and also a section into the track 21, along which the front part is moved. In the middle of the track there is the track gap 22, along which the chain arms 38 are moved. Opposite the cutting unit (FIG. 9) the front part 12 is controlled by an elastic horizontal track 23 at each side. The size of the front part is felt by means of the ski 24 for controlling the elevation of the knife 29.

FIG. 9 illustrates the knife 29 and the plough unit 14 to 20 in isometric view with the references from FIG. 7.

Figure 10:
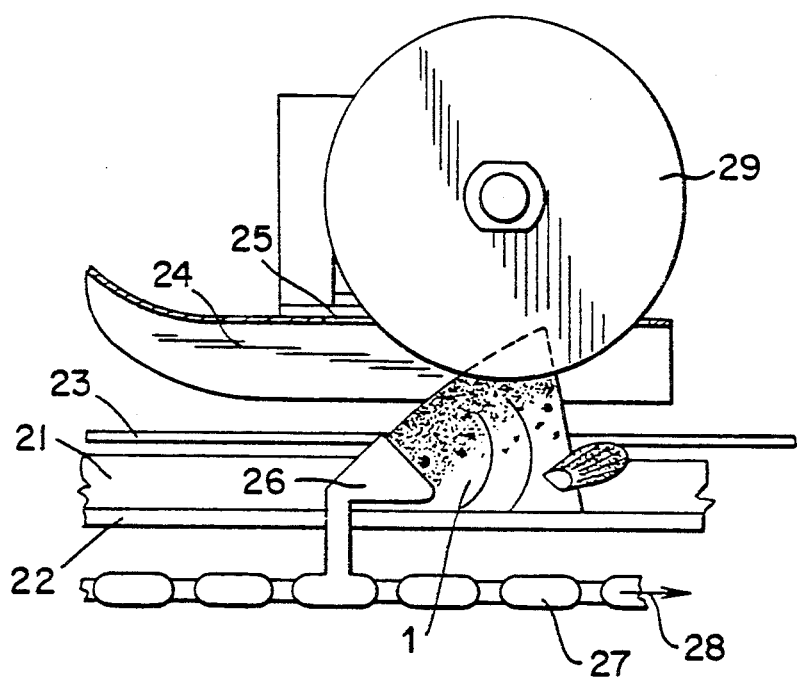
FIG. 10 illustrates transport equipment and control equipment for the front part 1 together with a fixed cutting knife for a vertical cut for front parts of equal size. Plough unit is not shown in the figure.

FIG. 10 illustrates the transport-and control unit from FIG. 8 seen from one side. Fish part 1 is a front part in track 21, 22 is the track gap, 23 is the horizontal track, 24 is the ski, 25 is the knife gap, 26 the snout pusher, 27 the transporting chain, and arrow 28 indicates the direction of movement of the front part 1.

Figure 11:
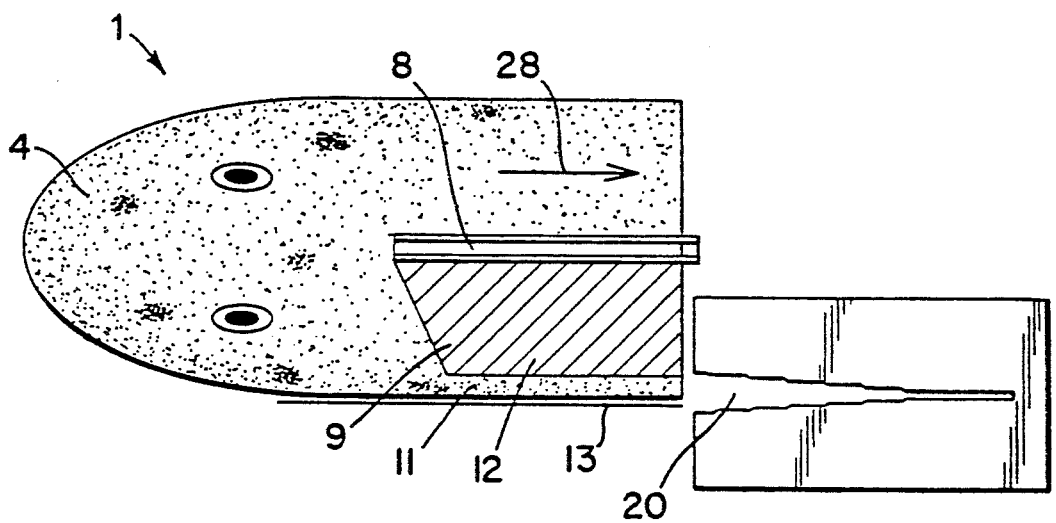
FIG. 11 illustrates the removal of the skin from the nape muscle in a skin removing gap 20.

FIG. 11 illustrates, from above, the removal in gap 20 of the skin from a front part. The front part 1 with the head 4 and the spinal crest 8 is moved in moving direction 28 into a linear knife, which cuts the horizontal cut 9, leaving a narrow portion of uncut flesh 11 along the side of the front part. During this movement the connecting part or flap of skin 13 moves into the gap 20, is pulled through the gap, the nape muscle 12 is retained on the plough shoulder 16 (see FIG. 8) above the gap 20 and thereby the skin is removed from the nape muscle 12. In the figure the front part is partially sectioned in order to illustrate the cut 9. FIG. 12 illustrates the transport-and control unit 21 to 27, illustrated in FIG. 10, and the plough unit 14 to 20, which is adjacent to the housing 31 of the shaft of the circular knife 29, which is powered by the rotary shaft 30. In addition the figure illustrates the parallelogram control unit for the knife 29 to accommodate for small and big front parts 1.

Fixed into the frame is the supporting tower 32 having two joints 33, connected to two arms 34, which together with rivot joints 35 to the shaft 30 bearing housing 31 are forming a parallelogram type of kinematic translation linkage, resulting in the knife 29 and the plough unit 14 to 20, which are connected into the joints 35 by the parallel lever arms 34, are translated up and down without rotation. The knife 29 is therefore elevated as much as the plough, so that the relative position of knife 29 and plough 14 to 20 remains unchanged.

The ski 24 is fixed into the arms 34 at greater distance and is therefore elevated more than the knife 29, so that the vertical cut is greater for big front parts, for accommodation for greater nape muscle 12 on a great front part 1.

The surplus movement of the ski 24 and the depth of the cut can be changed by translation of the arm and pivots 35 along the gaps 37 for accommodation for different species of fish.

FIG. 13 illustrates the relative movement of the axes 33, 35 and 36 together with the vertical movement 39 of the cutting knives 29 and the plough 14 to 20 at the inclination of the arm 41 and respective surplus movement 40 of the ski 24 and thereby increase in depth or height of cut. The distances between the axes are controllable by gaps 37 in the arms 34. Thereby the depth of the cut is controlled.

What is claimed and desired to be secured by Letters Patent is:

1. A method for cutting nape muscle 12 from a front part 1 of a fish comprising: moving the front part along a straight transport track; placing the front part on the straight transport track so a straight line from the top of the head bone to the rear end of the spine of the front part is parallel to the straight transport track; cutting two side-by-side vertical cuts along the opposite sides of the spinal crest from the end of the spine to the headbone; cutting two lateral cuts, one on each side of the front part from the end of the spine to the top of the head bone; whereby the nape muscle at each side of the spinal crest, still connected with the skin, is cut from the bones of the front part leaving a small uncut portion of the nape muscle adjacent the associated remaining side portion of the front part.

2. A method for cutting nape muscles 12 from a front part 1 of a fish comprising: moving the front part along a straight transport track; placing the front part on the straight transport track so a straight line from the top of the head bone to the rear end of the spine of the front part is parallel to the straight transport track; cutting two side-by-side vertical cuts along the opposite sides of the spinal crest from the end of the spine to the headbone; cutting two laterally disposed cuts adjacent respective sides of the front part from the spinal crest to a location closely adjacent but spaced from the skin; pulling, by moving of the front part along the transport track, the skin still attached to the nape muscle through a gap, whereby only the skin passes through the gap, and the flesh of the nape muscle remains, and whereby the nape muscle at each side of the spinal crest is partly cut from the bones of the front part and partly torn from the skin, so that each skinfree nape muscle is entirely separated from other parts of the front part.

3. A machine for cutting the nape muscles from a front part of a fish with the nape muscles being cut away from the bones in the front part of the fish, the machine comprising: a straight path transport track; means for moving the front part backwards along said straight path track with a straight line from the top of the head bone to the rear end of the spine of the front part of the fish being parallel with the straight path of said track; knife means including support means and knife blades disposed transverse to the direction of motion of the front part along the straight track path; said knife means comprising two vertical, side by side, spaced apart, knives arranged on said support means for making two spaced-apart vertical cuts, one cut being at each side of the spinal crest of the front part down to the line from the top of the head bone to the end of the spine through the upper part of skin and the nape muscles, and two spaced apart laterally disposed knife units on said support means, disposed above said straight track path, each with a lateral, sharp knife blade edge, each blade edge disposed for cutting a lateral cut, at each side of the spinal crest intersecting the bottom of the previously mentioned vertical cut, from the rear to the front of the front part at the spinal crest, each said lateral sharp blade edge being dimensioned so it solely cuts the nape muscle and not the side skin of the front part, whereby each nape muscle of the front part with its adjacent skin still attached to the side skin of the front part is cut and separated from the other parts of the front part.

4. A machine as defined in claim 3, wherein each of said laterally disposed knife units comprises a plough spade, with a said sharp plough blade edge, which constitutes a laterally disposed plough blade, and a parallel means spaced-apart from said plough spade to form a fish-skin gap, each said plough spade continuing, in the direction of movement of the front part, from its said plough blade and disposed so that it will pass under the cut nape muscle and on the inner side of the side skin to which the nape muscle is attached, and its associated said parallel means being disposed beside said plough spade and closely adjacent the outer side of the side skin to which the nape muscle is attached; whereby as the front part is moved, by said means for moving a front part, backwards along the straight path transport track, so that the section skin still connecting the nape muscle to the front part is moved into the said skin gap and is pulled through the gap when the front part continues to be transported along the transport track, and the plough spade and said associated parallel means which provides said skin gap are spaced sufficiently close to impede the cut nape muscle and prevent its being pulled through said gap, the nape muscles thereby being cut from the bones of the front part and the skin being pulled and torn from the nape muscles as the front part is transported along the track.

5. A machine as defined in claim 4, wherein each plough spade has a configuration which is contoured with an inclination directed outwardly from said track and having an increasing angle of upward inclination from the lateral plane of the straight track.

6. A machine as defined in claim 5, wherein said machine includes a slide member adjacent each plough blade and each plough blade includes a plough-shoulder which constitutes an outwardly and upwardly inclining curved structure which is adapted to move the cut nape muscle sideways away from the spinal crest of the front part as the skin is removed from the nape muscle and passes the separated nape muscle away and downward from the straight track and onto the associated slide member.

7. A machine as defined in claim 6, wherein said two vertical knives are rotatable circular knives mounted on a rotating shaft, and said support means includes bearing means mounting said shaft; said plough spade with its plough knife and the associated adjacent parallel means which forms the skin gap are mounted on said support means; a sensing skid is fixed on said support means and engages the top portion of and senses the elevation of a front part of a fish above the transport track as it is moved along said straight transport track; said support means includes a movement translation means responsive to the elevation dimension sensed by said skid to control elevation, without tilting, of said support means, the knife means, the plough spades and adjacent associated parallel means, whereby said knife means are moved to and from said straight track to accommodate small and big front parts of fish.

8. A machine as defined in claim 7, wherein said movement translation means comprises a parallelogram type of kinematic linkage.

* * * * *